United States Patent [19]
Ballard et al.

[11] Patent Number: 6,044,439
[45] Date of Patent: Mar. 28, 2000

[54] HEURISTIC METHOD FOR PRELOADING CACHE TO ENHANCE HIT RATE

[75] Inventors: Clinton L. Ballard, Suquamish; Timothy W. Smith, Seattle, both of Wash.

[73] Assignee: Acceleration Software International Corporation, Poulsbo, Wash.

[21] Appl. No.: 08/958,074

[22] Filed: Oct. 27, 1997

[51] Int. Cl.[7] .................................................. G06F 12/00
[52] U.S. Cl. ............................. 711/137; 711/3; 711/143
[58] Field of Search ............................. 711/3, 137, 143, 711/204, 213

[56] References Cited

U.S. PATENT DOCUMENTS

| | | | |
|---|---|---|---|
| 4,792,917 | 12/1988 | Takamatsu et al. | 710/21 |
| 5,235,697 | 8/1993 | Steely, Jr. et al. | 711/137 |
| 5,388,247 | 2/1995 | Goodwin et al. | 711/143 |
| 5,461,718 | 10/1995 | Tatosian et al. | 711/206 |
| 5,483,641 | 1/1996 | Jones et al. | 710/3 |
| 5,524,220 | 6/1996 | Verma et al. | 712/207 |
| 5,553,305 | 9/1996 | Gregor et al. | 709/106 |
| 5,588,128 | 12/1996 | Hicok et al. | 711/204 |
| 5,696,701 | 12/1997 | Burgess et al. | 364/551.01 |
| 5,752,263 | 5/1998 | Kranich | 711/137 |

*Primary Examiner*—Do Hyun Yoo
*Assistant Examiner*—Mehdi Namazi
*Attorney, Agent, or Firm*—Steven P. Koda

[57] ABSTRACT

Computer system activity is monitored to identify triggers. A trigger is an event or sequence of events which is a reliable predictor of the subsequent occurrence of a specific repeated disk-intensive interval. A disk-intensive interval is an interval of time in which disk read and/or disk write operations occur at a much greater than average rate. Once a trigger and a corresponding repeated disk-intensive interval are identified, a time log constructor is invoked. The time log rearranges the input/output for faster access and loading of the cache. This reduces disk drive latency. When the trigger is detected, instead of waiting for the data request the computer processes the time log to preload the disk data into cache in advance of the data request. When the data request occurs thereafter, the data is already present in the cache.

20 Claims, 5 Drawing Sheets

HEURISTIC METHOD FOR PRELOADING CACHE TO ENHANCE HIT RATE

CROSS REFERENCE TO RELATED APPLICATIONS

This invention is related to U.S. patent application Ser. No. 08/656,372 filed May 31, 1996 for "Estimating Access Time for Hard Drive I/O Requests;" U.S. patent application Ser. No. 08/839,742 filed Apr. 15, 1997 for "Program Launch Acceleration;" and U.S. patent application Ser. No. 08/874,244 filed Jun. 13, 1997 for "Program Launch Acceleration Using RAM Cache". The content of these applications are incorporated herein by reference and made a part hereof.

BACKGROUND OF THE INVENTION

This invention relates to methods and apparatus for caching data, and more particularly to a method and apparatus for preloading data into cache.

A typical computer system includes at least a processing unit, a display device, a primary storage device (e.g., random access memory—RAM), a secondary storage device (e.g., a disk storage device), a keyboard, and a pointing/clicking device. Once a computer program is installed on the computer the program resides on the secondary storage device. The secondary storage device serves as a large permanent memory space. Exemplary secondary storage devices include a hard disk drive, a floppy disk drive, and a compact disk drive. There are many different types of disks, including magnetic disks, magneto-optical disks, optical disks, and floppy disks. The primary storage device commonly serves as a cache for improving access time to data stored on the secondary storage device media. For example, when launching a program that is stored on the secondary storage device media, portions of the program are accessed and moved to the primary storage device. Conventionally, the primary storage device has a smaller address space and is accessed faster than the secondary storage device.

A conventional method for preloading cache memory is called look ahead caching. Under such method when a block of data is moved into cache in response to a data request, the cache also moves one or more adjacent blocks of data It is assumed that in many cases a subsequent data request will come for an adjacent block, so such block is preloaded. This invention is directed to another method of preloading cache.

SUMMARY OF THE INVENTION

According to the invention, computer system activity is monitored. Specifically events occurring in the system are monitored. When a select event or combination of events occurs, such event or combination serves as a trigger to preload specific data into cache. According to one aspect of the invention, a circular log of events is maintained. Such log is analyzed to determine whether there is a pattern of events preceding a specific request for data. If a correspondence is made between an event or combination of events and a specific data request, then the event or combination of events serves as a trigger. Thereafter, whenever such trigger occurs, instead of waiting for the data request the computer preloads the data into cache in advance of the data request. When the data request subsequently occurs, the data is already present in the cache.

According to another aspect of the invention, the log of events is not analyzed merely for any data request. The log is processed to find repeated disk-intensive intervals. A disk-intensive interval is an interval of time in which disk read and/or disk write operations occur at a much greater than average rate. The rate is measured by the number of operations per second or the amount of data transferred per second. An average is maintained. A disk-intensive interval occurs when the current rate is at least a prescribed percentage above the current average rate. Disk-intensive intervals may occur for example during the start of a computer application program, during the loading of a data file, or in response to a specific application program command.

According to another aspect of this invention, a trigger is an event or sequence of events which is a reliable predictor of the subsequent occurrence of a specific repeated disk-intensive interval. For example, the user double-clicking on an icon for an application program is a reliable indicator that the application program files are to be accessed. Computer system events include user interface events, file system events, disk drive events, process events, and other miscellaneous events.

According to another aspect of the invention, a trigger is identified by examining the events in the log preceding a repeated disk-intensive interval log entry under analysis. An event or a combination of events that occurs in all or most of the occurrences of the specific repeated disk-intensive interval events is a candidate for a trigger. To determine if the candidate is to be a trigger, the occurrences of the candidate trigger are checked to see that the specific repeated disk-intensive interval event follows such candidate trigger at least a prescribed percentage (e.g., 67%) of the time.

According to another aspect of the invention, once a trigger and a corresponding repeated disk-intensive interval are identified a time log constructor is invoked. The time log constructor determines whether using a time log to re-organize the data access during the disk-intensive interval would improve performance. For example, if the repeated disk-intensive interval includes scattered input/output, then a time log is constructed to rearrange the input/output for faster access and loading of the cache. This reduces disk drive latency. When the data is later accessed during the disk-intensive event the data is accessed again in the scattered order, although the data already is present in cache. In another example, even if the input/output is not scattered, if the trigger occurs long enough before the repeated disk-intensive interval then a timelog is useful to perform the input/output in the background before the disk-intensive interval event occurs.

According to another aspect of the invention, the disk-intensive interval refers to access to a hard disk drive, a CD-ROM or other storage media and the cache refers to a RAM cache or a hard disk cache used for a slower media (e.g., portion of a hard disk used to cache data from a CD-ROM).

According to another aspect of the invention, a counter is maintained for each time log to track how many times or how frequently it has been played. At any given time, the time log whose counter is the highest is the time log which is most frequently used. During times of low system activity the background time log player activates and goes through the list of time logs starting with the most frequently used time log to less frequently used in order based upon frequency of use.

According to another aspect of the invention, in some embodiments a user is able to select a group of time logs to be run at system start-up. For example, the user may specify a number of application programs. If a time log exists for such program then it is run at system start-up.

According to another aspect of the invention, time logs are monitored to assure that they are effective and stay effective. If a time log is ineffective it is discarded and a new time log is recorded. Effectiveness is determined by comparing the time from trigger to playback a time log versus the time for the corresponding RDII to complete. Alternatively, disk activity occurring during an RDII is monitored to determine effectiveness. If during the RDII there is a lot of disk activity, then the time log is not effective. If there is not a lot of disk activity (instead there is a lot of cache 15 activity), then the time log is effective. Another approach is to mark each block stored in cache as being stored during the playback of a time log or not, then checking such history after completion of an RDII.

One advantage of this invention is that unused processing time is utilized in part to preload cache heuristically. Another advantage is that system events are monitored to look for triggers acting as reliable predictors of events requiring access to specific data. These and other aspects and advantages of the invention will be better understood by reference to the following detailed description taken in conjunction with the accompanying drawings.

BRIEF DESCRIPTION OF THE DRAWINGS

FIG. 6 is a flow chart of a process for playing back time logs according to an embodiment of this invention;

DESCRIPTION OF SPECIFIC EMBODIMENTS
Overview

Figure 1:
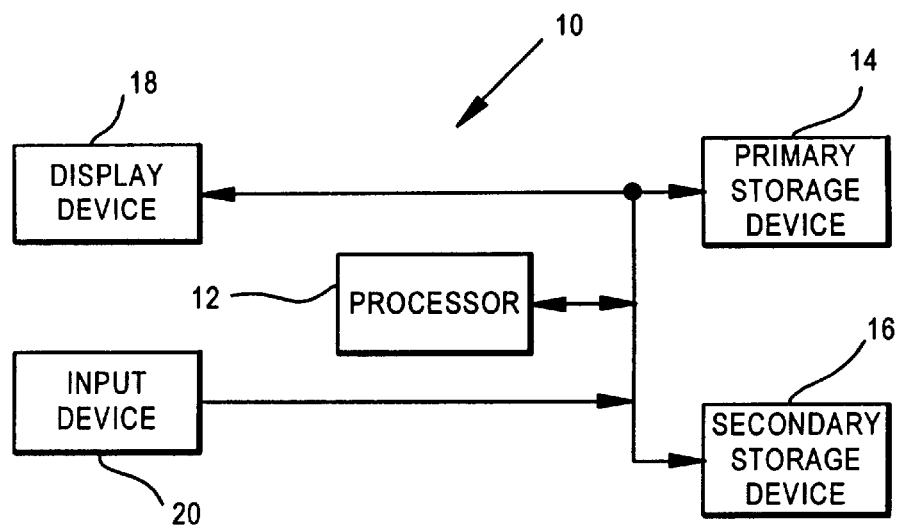
FIG. 1 is a block diagram of a host computer system for the method and apparatus of this invention.

FIG. 1 shows a block diagram of a computer system 10 hosting an embodiment of this invention. The computer system 10 includes a processor 12, a primary storage device 14, a secondary storage device 16, a display device 18 and one or more input devices 20. In one configuration the computer system is a personal computer, configured in a stand-alone environment or as part of a network. In another configuration the processor 12, primary storage device 14, display device 18 and input devices 20 are part of one computer while the secondary storage device is part of another computer (e.g., server) on a network. In yet another configuration the display 18 and input devices 20 are part of one computer, while the processor, primary storage device and secondary storage device are part of another computer on the network.

The processor 12 serves to execute an operating system and one or more application computer programs. In some embodiments there are multiple processors for executing the operating system and application programs. System utilities and/or operating system extension programs also are executed according to some computer system 10 embodiments. Conventional operating systems include DOS, Windows, Windows NT, Mac O/S, OS/2 and various UNIX-based operating systems. The display device 18 and input devices 20 enable interaction between a user and the computer system 10. The computer system 10 in the process of executing the operating system and zero or more computer programs defines an operating environment for a user to interact with the computer, operating system and executing computer program. The display device 18 serves as an output device. Exemplary display devices include a CRT monitor or flat panel display. The user inputs commands and data to the computer system 10 via the input devices. Exemplary input devices include a keyboard, a pointing device and a clicking device. Data also is input to the computer via transportable disks or through I/O ports (not shown).

The secondary storage device 16 serves as a permanent storage memory for one or more computer programs 24 to be executed by the processor 12. The secondary storage device 16 also stores data files for use with the application computer programs. Exemplary secondary storage devices include a hard disk drive, floppy disk drive, CD-ROM drive, bernoulli disk drive or other drive system for accessing permanent or replaceable disks, such as floppy disks, magnetic disks, magneto-optical disks, or optical disks.

The primary storage device 14 typically is a storage device having a faster access time than that of the secondary storage device. An exemplary primary storage device 14 is random access memory (RAM). Often the RAM serves as a cache. Portions of a computer program and/or data files are loaded into the RAM to speed up execution of the program and processing of data. Mass produced computer software typically include specifications requiring a minimum amount of RAM required to run the program on a given computer system. During a launch sequence for starting such a computer program, portions of the program are copied from the secondary storage device into RAM.

Figure 2:
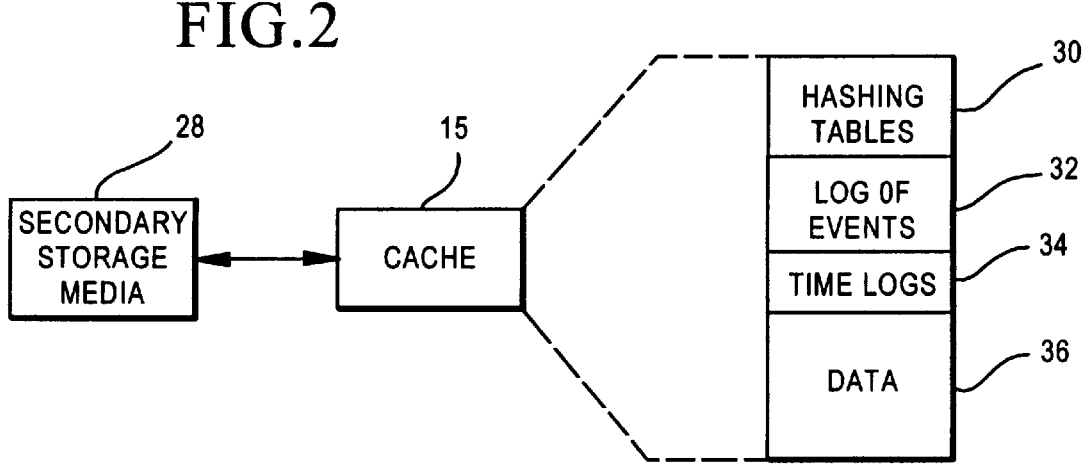
FIG. 2 is a block diagram of a cache and secondary storage device media according to an embodiment of this invention.

FIG. 2 shows a diagram of a secondary storage device 16 and a cache 15. In one embodiment the cache 15 is implemented in RAM 14. In an alternative embodiment (e.g., for a CD-ROM accelerator), the cache 15 is implemented as a portion of a hard disk media 28 (e.g., of a secondary storage device 16) and stores information for slower media such as a CD-ROM. According to an embodiment of this invention, the cache 15 includes hashing tables 30, an event log 32, one or more time logs 34 and data 36. The hashing tables relate specific units of data 36 to a specific storage volume and specific address range on the storage volume (e.g., secondary storage medium.) The event log 32 is the event log defined below. The time logs 34 are the time logs defined below. The data 36 is the data copied from the secondary storage device 16 into the cache 15 which enables faster access to such data by a processor 12 or peripheral device.

Definitions

Several terms are used herein to describe the invention. Following is a list of definitions for some of such terms:

Event—An event is an activity that occurs on a computer which software can detect. User-interface events, for example, include pressing of keys, movement of a mouse, opening or closing windows in a graphical user interface, clicking on items in a graphical user interface, positioning a cursor with a mouse. File system events include the creating, deleting, renaming, moving, opening, or closing of a file or the reading or writing to a file. Disk drive events include reading a sector from a disk, writing a sector to a disk, formatting a disk, ejecting a removable disk, and the insertion of a removable disk. Process events include the loading of a program, the termination of a program, and satisfaction of any condition tested for by a program. These examples of events are not exhaustive. Other miscellaneous events include events related to networks, printing, CD-ROM, video, voice recognition, sound generation, modem commands, and on-line operations.

Disk-Intensive Interval (DII)—A disk-intensive interval is an interval of time during which disk read and/or disk write operations occur at a rate which is a prescribed amount faster than an average rate. In a preferred embodiment the DII operations occur at least 5 times that of an average data throughput rate for a given disk drive, although other multiples or fractions may be used. The rate is measured periodically as the number of operations occurring per second in one embodiment or by the amount of data transferred per second in an alternative embodiment. An example of a disk-intensive interval is the time during which an application program is started up. Another example, is the time during which a large data file is read. Another example is the time during playback of a video and/or audio clip. Another example is the spooling of a large file to a printer or fax-modem queue. Another example is the time for reloading parts of a program that have been swapped or paged out of memory to the disk.

Repeated Disk-Intensive Interval (RDII)—A repeated disk-intensive interval is a DII that is the same or similar to another DII that occurred earlier. Two DII's are considered similar if at least 75% of the blocks accessed by each are the same. The criteria percentage however may vary for differing embodiments. An example of an RDII is the launch of a computer program. Every time the program starts, the program executable file and possibly several dynamically linked libraries are read from disk These are the same for each launch. Even is there is other disk activity during the start-up such as the reading of configuration files which may have changed since the last start-up, for most programs the bulk of the disk activity will be the same or very similar.

Spurious Disk-Intensive Interval (SDII)—a spurious disk-intensive interval is a DII that is not an RDII.

Launch sequence—A launch sequence as used herein means the sequence of steps executed by the computer system while starting up a given computer program and getting the computer ready to accept input commands for the computer program. A launch sequence is executed for a computer program. Different computer programs have different launch sequences. Steps included in a launch sequence include copying portions of the computer program being launched from the secondary storage device to the primary storage device. Other steps may include allocating a port or device to serve as an input source and/or output receptor. Each step in the launch sequence is formed by at least one event.

Trigger—A trigger is an event or combination of events which occurs before an RDII. Such event or combination of events is a trigger if it reliably predicts the subsequent occurrence of the RDII. For example, the user double clicking on a program icon is a good predictor that the RDII for the program launch sequence is to occur.

Event log—The event log is a data structure that stores event information occurring on the computer system.

Time log—A time log is a data structure of the events forming an RDII. For example, for a program launch RDII the time log stores each disk drive event including in the launching and loading of the computer program. A given time log is associated with a given RDII.

Process A—Log Events

Figure 3:
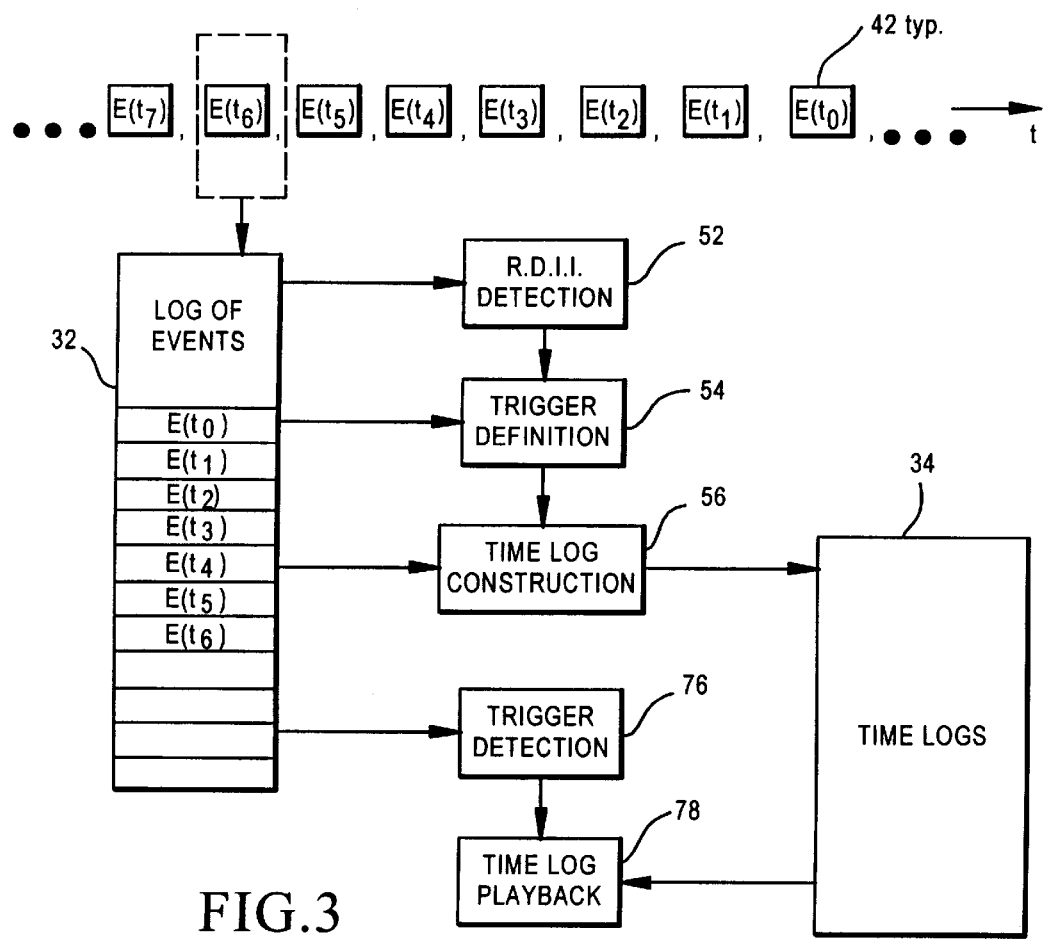
FIG. 3 is a data and functional flow diagram of an embodiment of the method and apparatus of this invention.
Figure 4:
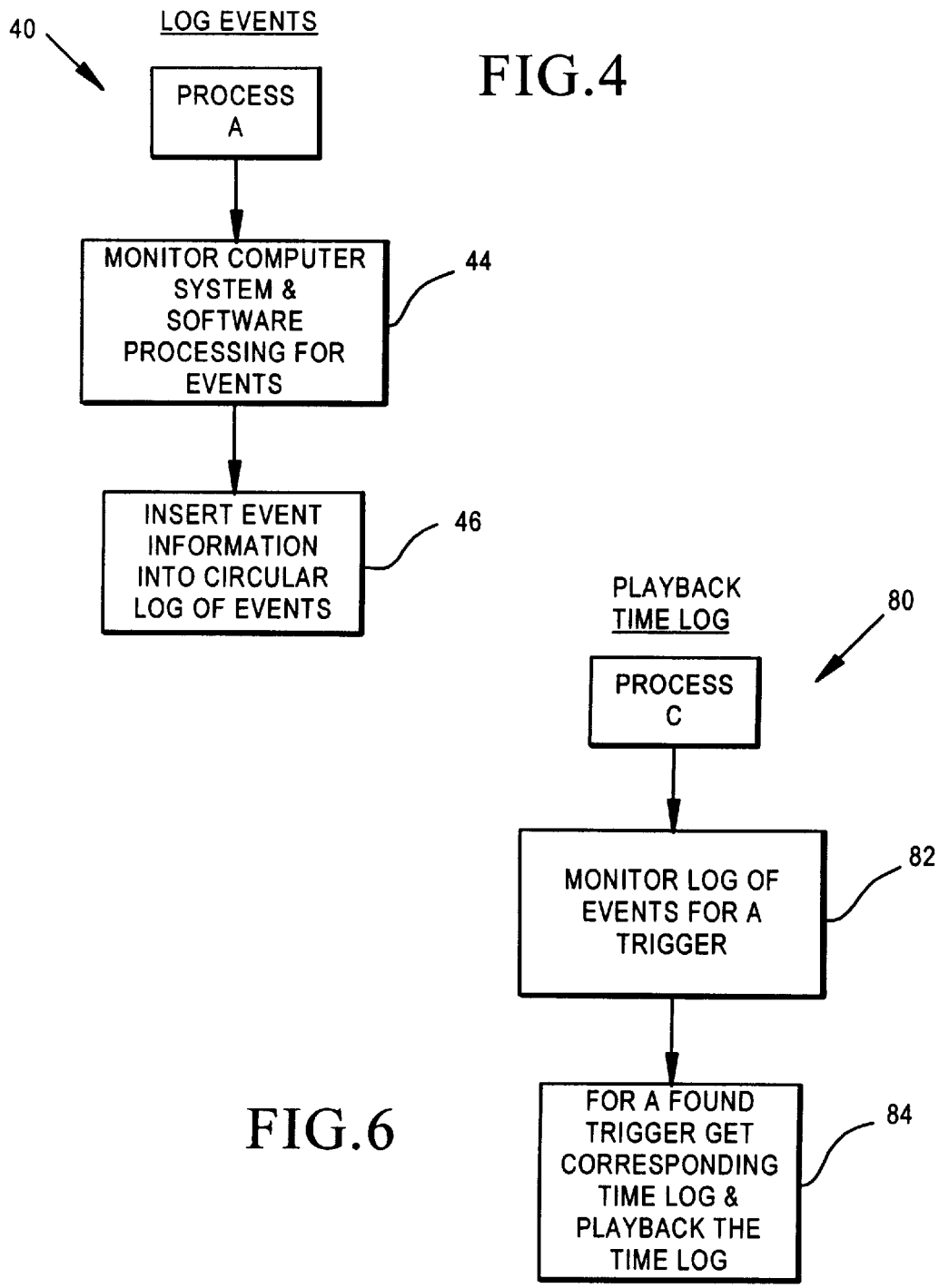
FIG. 4 is a flow chart of a process for logging events according to an embodiment of this invention.

FIG. 3 shows a data and control flow diagram for an embodiment of this invention. FIG. 4 is a flow chart 40 of a process A for logging events. During operation of the computer system 10 events 42 occur over time. Such events need not be related nor synchronously spaced. According to an aspect of this invention, whenever an event 42 occurs process A activates to log the event in the event log 32. Process A in effect monitors the system at step 44 to determine when an event 42 occurs. In one embodiment this is implemented by an interrupt or software trap service routine. FIG. 3 shows events $E(t_0)$ through $E(t_7)$ occurring at random time intervals. At step 46 information for a current event 42 is added to the event log 32. As depicted in FIG. 3, events $E(t_0)$ through $E(t_5)$ have already occurred and been logged. Event $E(t_6)$ has been detected and is being logged. Event $E(t_7)$ has yet to occur. When it is detected it will be entered into the event log 32 following the entry for event $E(t_6)$. In one embodiment the event log is a circular data structure. When the last slot in the log 32 fills up, a pointer moves to the top of the structure to store the event information for the next event at such top location. Thereafter events overwrite prior events. Following is a format for storing event information according to a specific embodiment:

1. Type of event
2. Name of affected file
3. Beginning point in file
4. Ending point in file
5. Other information The type field indicates what type of event is indicated (e.g. file opened; file closed; file read; file write; file delete). The name field indicates the specific file pertaining to the event, (e.g., actual name; file code; index in table of names, . . . ) The beginning and ending fields indicate what part of the file is affected by the event, where relevant. Other information is reserved for specific embodiments. In an exemplary embodiment a name change may be an event, the additional information is used in such case to store the new name for the file.

Process B—Define Triggers and Time Los

Figure 5:
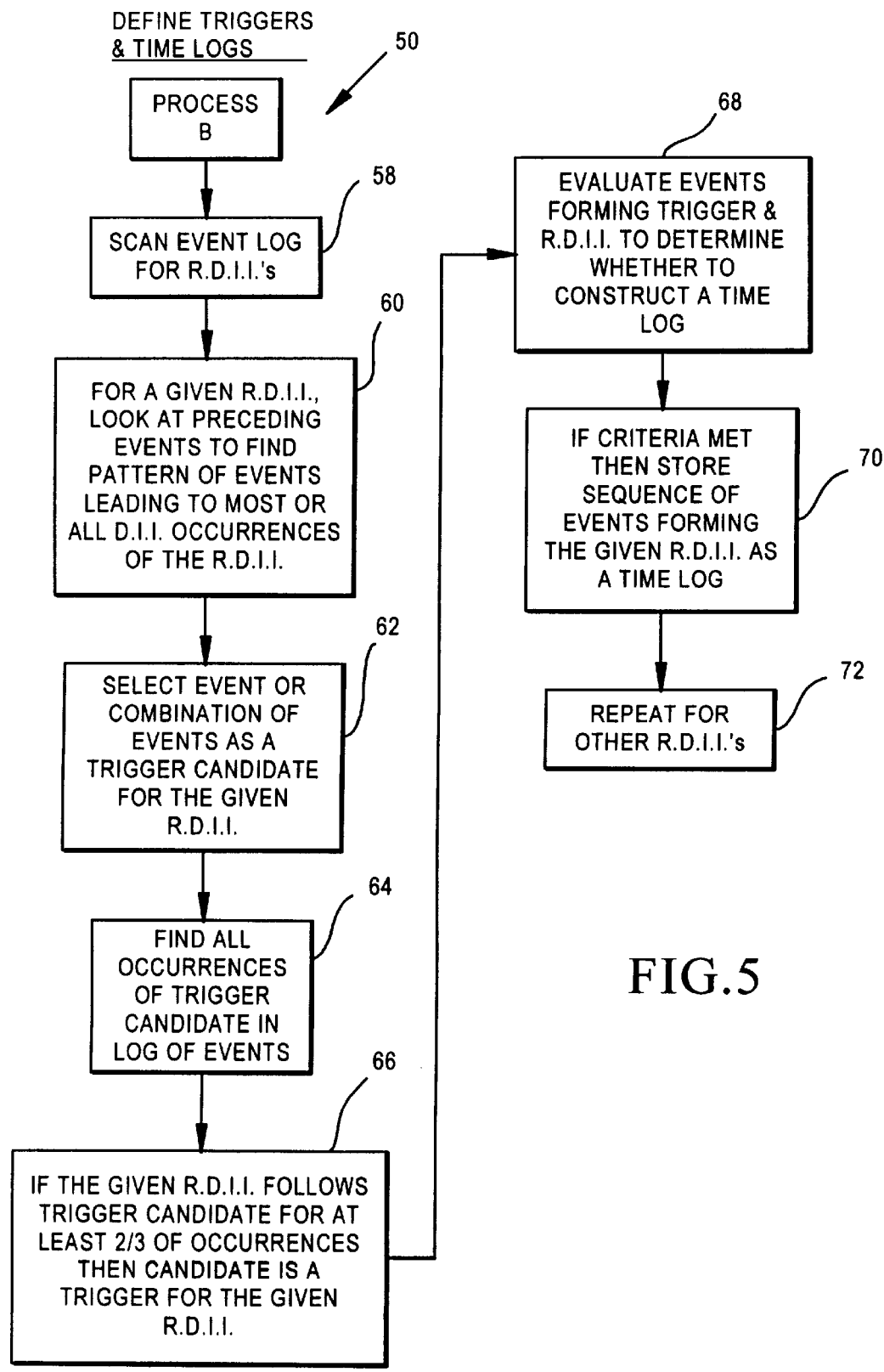
FIG. 5 is a flow chart of a process for defining triggers and constructing time logs according to an embodiment of this invention.

FIG. 5 shows a flow chart 50 for a process B which defines triggers and constructs time logs. Periodically in the background of computer system activity or during maintenance activities, process B is executed. Process B includes generally the functions of RDII detection 52, trigger definition 54 and time log construction 56 (see FIG. 3). At step 58 the event log 32 is scanned to find any repeating disk-intensive intervals (RDII—see definition above). The RDII is made up of one or more disk drive events. This step corresponds to the RDII detection function 52.

For each RDII which has not already been given a trigger, steps are performed to determine whether there is a trigger and whether a time log is to be constructed. Steps 60 to 66 relate to the trigger definition function 54. At step 60 events preceding those events making up the RDII under evaluation are examined. For each occurrence of the RDII under evaluation, the events preceding the RDII are checked to see if they are present in a programmed number (e.g., ⅔) of the RDII occurrences. Such number may vary for different operating systems, and for different kinds of RDII'S. The value may be fixed, or may change dynamically based upon empirical testing. At step 62 multiple candidates triggered are selected from these events present in at least two-thirds of the time. At step 64 and step 66 each candidate trigger is tested to see if it is able to serve as a trigger. At step 64 for a given candidate trigger, all occurrences of the candidate trigger are found. At step 66 the candidate trigger is evaluated by seeing if the RDII under evaluation occurs after such candidate trigger in at least ⅔ of the occurrences of the candidate trigger. This is done for each candidate trigger. Each candidate trigger remaining (i.e., each candidate successfully predicting the RDII in at least two thirds of the time) then is compared for reliability. Of those remaining candidates the one candidate trigger with the highest success rate is the best indicator and thus is taken as the trigger for the RDII under evaluation.

Steps 68 and 70 correspond to the time log construction function 56. At step 68 the events forming the RDII are evaluated to determine if use of a time log to prestore the data in cache 15 in response to its trigger will lead to improved access to the data According to a specific embodiment, for a time log to be constructed either of the following criteria are to be met:

1. Re-arranging the disk drive data requests forming the RDII will result in faster retrieval of the data from the disk drive;

2. Re-arranging the data request will not result in faster retrieval, but the trigger occurs earlier enough before the RDII events that the data can be present in the cache when the predicted RDII events occur.

First criteria: Will re-arranging data requests improve access time? Consider an example where two files, A and B, are both read in the following manner as part of an RDII: (i) read last one-half of file A; (ii) read first one-half of file B; (iii) read first one-half of file A; and (iv) read last one-half of file B. This pattern wastes time by seeking back and forth between the files. By rearranging the order so that all of file A is read, then all of file B, much seeking is eliminated. In general, there may be much switching between reading portions of one file, then another file. If there are several accesses to a file, with accesses to other files interspersed, then it is considered faster to combine the accesses to such one file into one larger access or a series of consecutive accesses without intervening accesses to other files.

Second Criteria: Is there enough lead time between trigger and RDII to warrant a time log? Even if re-arrangement of the events will not improve access time, if the trigger occurs a significant time interval before the RDII, then that interval of time can be used to run the time log and preload the data into cache before the events forming the RDII occur. The significant time interval is derived empirically and is a prescribed time which may vary for differing embodiments.

Figure 7:
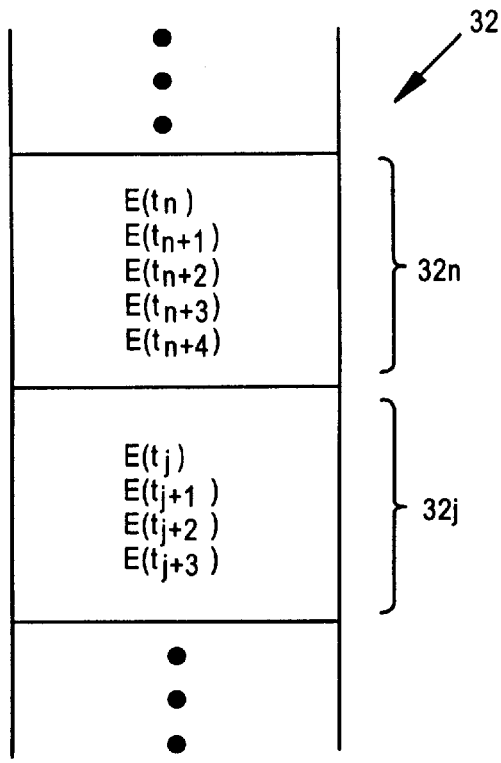
FIG. 7 is a diagram of a table of time logs according to an embodiment of this invention.

If either of such criteria are satisfied then at step 70 the events forming the RDII are copied from the event log 32 into a time log 34 for such RDII. At step 72 the process steps 60–70 are repeated for another RDII to be evaluated. Each RDII meeting the criteria of step 68 has its own separate time log 34. For example, there maybe an RDII corresponding to the launch sequence of a first application program (e.g., there may be for example 3 DII corresponding to 3 start-ups of this application program). Another RDII may correspond to the launch sequence of a second application program. Separate time logs 32 are created for each of these RDIIs when respective triggers are found and each RDII meets the criteria of step 68. FIG. 7 shows an exemplary data structure 32 including time logs for multiple RDIIs. Time log 32n includes five events $E(t_n)$ through $E(t_{n+4})$ and corresponds to a specific RDII. Time log 32j includes 4 events $E(t_j)$ through $E(t_{j+3})$ and corresponds to a different RDII.

In some embodiments instead of simply copying the RDII events into a time log, the events are processed for improving access time. For example, redundant accesses to the same memory block are eliminated to optimize access time for the secondary storage device. Related U.S. patent application Ser. No. 08/874,244 filed Jun. 13, 1997 for "Program Launch Acceleration Using RAM Cache" describes testing for and eliminating redundancy in detail. In such application an example is given for creating a log file for a program launch sequence. Such log file corresponds to a time log herein. The contents of such log file are disk drive events re-organized to improve access time and eliminate redundant requests. Related U.S. patent application Ser. No. 08/656,372 filed May 31, 1996 for "Estimating Access Time for Hard Drive I/O Requests" describes additional processes for re-organizing data requests (i.e., disk drive events) to improve access time. By implementing such stochastic techniques the events forming an RDII are re-arranged to yield an improved access time.

Process C—Playback Time Log

Figure 8:
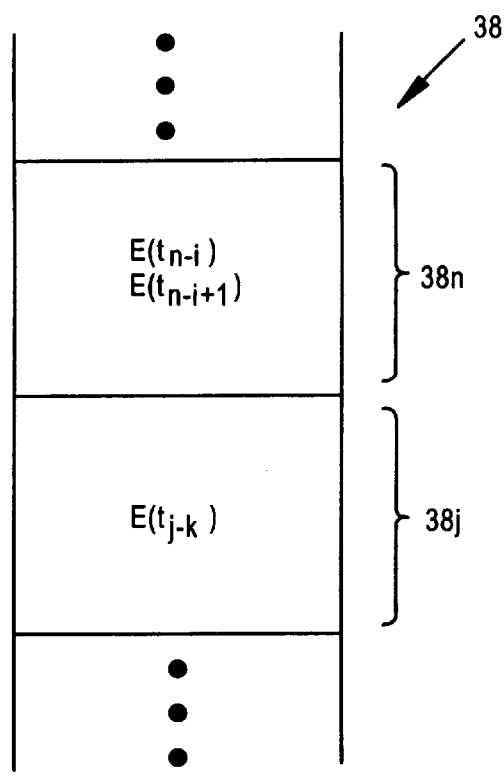
FIG. 8 is a diagram of a table of time log triggers according to an embodiment of this invention.

FIG. 6 shows a flow chart 80 for a process C which performs the trigger detection function 76 and the time log playback function 78 of FIG. 3. In one embodiment process C is part of or called with process A to in effect monitor the system events. In one embodiment the process(es) are implemented by an interrupt or software trap service routine. The trigger detection function 76 is performed by step 82 of process C. When an event 42 occurs it is checked against events serving as a trigger. FIG. 8 shows an exemplary table of triggers 38. Trigger 38n is the trigger for time log 32n and is formed by two events $E(t_{n-i})$ and $E(t_{n-i+1})$. Note that these events forming the trigger occur in time before the events forming the corresponding RDII. Although the events defining the trigger 38n appear to be consecutive system events, such events need not be consecutive. Other events can occur between events defining a trigger. FIG. 8 also shows trigger 38j which is the trigger for time log 32j. Trigger 38j is formed by one event $E(T_{j-k})$.

When an event 42 occurs process C tests such event against the lead event of each trigger 38. If for example, such event is the same event as the one-event trigger 38j (i.e., $E(t_{j-k})$) then such trigger 38j has occurred. At step 84 process C then plays back the corresponding time log 32j expecting the corresponding RDII making up the events in such time log 32j is to occur shortly. When an event of such RDII does occur (e.g., data request for certain block of data), such request is satisfied by getting the data from cache 15. The data is already present based upon the preloading occurring in response to the detection of trigger 38j.

In another example, process C detects that the same event as event $E(t_{n-i})$ has occurred. This corresponds to the first event in the trigger for time log 38n. Thereafter, when a subsequent event 42 occurs it is checked against the next event making up the trigger 38n (and against the next event for other triggers). If such event is the same as the next event for the trigger 38n (i.e., $E(t_{n-i+})$), then trigger 38n has occurred and time log 38n is played back at step 84. If such subsequent event, however was the same as the event for another trigger, then such other trigger has occurred or occurred in part. If it was the same as event $e(t_{j-k})$ then trigger 38j has occurred and time log 32j is played back. Thereafter, when another event occurs it still is tested against the second event of trigger 38n along with a lead or expected event for any other trigger in the table of triggers. According to one embodiment of this invention, if a subsequent event (event the same as $E(t_{n-i+1})$) in a trigger does not occur within a prescribed number of events after the prior event ($E(t_{n-i})$ in such trigger, then the event watched for such trigger moves back to the first event of the trigger. Thus, for each trigger formed by multiple events a respective pointer is maintained to see which event of the trigger to look for. If a prescribed number of events pass before the pointer advances, then the pointer resets to have step 82 watch for the first event of the trigger. When all events of a trigger occur before the pointer for such trigger is reset, then at step 84 the time log 32 corresponding to such trigger 38 is played back.

Background Timelog Player

According to another aspect of the invention, a counter is maintained for each time log to track how many times or how frequently it has been played. In one embodiment each time the time log is played back the counter is incremented. In an alternative embodiment, the counter is incremented by a fixed amount each time the corresponding time log is played and is decremented by another fixed amount after each time interval of a prescribed length. In the alternative embodiment the number of times the time log is played in effect is weighted based upon time.

At any given time, the time log whose counter is the highest is the time log which is most frequently used. During times of low system activity the background time log player activates and goes through the list of time logs starting with the most frequently used time log to less frequently used in order based upon frequency of use. The background time log player executes these time logs. The background time log player keeps track of how much of the cache 15 is filled by the time logs and corresponding data. When the cache is Filled to a prescribed percentage of capacity (e.g. 70%), then the background player stops running the time logs. Periodically, the background time log player updates its ordered list of time logs to execute based upon a current evaluation of most frequently to least frequently run time logs.

According to another aspect of the invention, in some embodiments a user is able to select a group of time logs to be run at system start-up. For example, the user may specify a number of application programs. If a time log exists for such program then it is run at system start-up.

Time Log Error Correction

To assure that time logs are effective and stay effective, they are monitored. If a time log is ineffective it is discarded and a new time log is recorded. If it is determined that an effective time log can not be obtained after a prescribed number of attempts, then a new one is not recorded.

According to one embodiment the effectiveness of a time log is monitored by measuring the time from the occurrence of a trigger to the completion of the time log corresponding to such trigger. This is compared to a time previously recorded when the RDII was first identified. Specifically, when an event is logged a system time is included in the log. When an RDII is identified and a time log constructed, the time span between the first event of the trigger and the last event in the RDII is obtained. If the time duration with the time log is not less than the duration without the time log then the time log is not effective.

According to another embodiment, the disk activity occurring during an RDII is monitored. For example, the amount of data transferred during the RDII is monitored. When a time log has been created for an RDII, then all or much of the time log should have been played back before the RDII occurs. If during the RDII there is a lot of disk activity, then the time log is not effective. If there is not a lot of disk activity (instead there is a lot of cache 15 activity), then the time log is effective. According to various embodiments, if no more than a prescribed percentage of disk I/O during an RDII came from the hard disk (as compared to from the hard disk and cache), then the time log to be considered effective. In alternative embodiments other criteria such as percentage of time during which hard disk activity occurs is used, (e.g., relative to total time of RDII).

According to yet another embodiment, when the caching software is linked to the processes A, B and C, the caching software is able to mark which blocks placed in the cache are a result of a time log playback. If a block of memory placed in the cache during time log playback is later accessed during the occurrence of the corresponding RDII, this weighs in favor of the time log being effective. If the block is not accessed, this weighs for the time log being ineffective. The evidence for effective and ineffective then are weighed to determine whether the time log is considered effective. The criteria can vary from embodiment to embodiment, (e.g., 50/50 may be sufficient; even 20% effective to 80% ineffective may still be considered to be effective for a frequently used time log).

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for preloading cache memory of a computer system, comprising the steps of:

logging events occurring on the computer system in an event log, said events comprising disk drive events;

examining the event log to identify a repeated disk-intensive interval of time, wherein the repeated disk-intensive interval is identified when there are multiple occurrences of a group of events, each occurrence of the group having at least a prescribed percentage of common events;

defining from one or more events in the event log occurring before an occurrence of said repeated disk-intensive interval a trigger which serves to predict a subsequent occurrence of the repeated disk-intensive interval;

constructing a time log of the group of events occurring during the repeated disk-intensive interval, said group of events comprising at least one disk drive event;

detecting occurrence of the trigger, and after detecting the trigger, preloading cache memory by executing said at least one disk drive event of said group of events in said time log.

2. The method of claim 1, in which the step of defining comprises selecting at least one candidate trigger which occurs before each one of a prescribed percentage of occurrences of the repeated disk-intensive interval; identifying from among the at least one candidate trigger, each one candidate trigger which precedes the repeated disk-intensive interval in at least a prescribed percentage of occurrences of said repeated disk-intensive interval; and selecting a trigger from among the identified each one candidate trigger, the candidate trigger which precedes the repeated disk-intensive interval the greatest prescribed percentage of occurrences of said repeated disk-intensive interval.

3. The method of claim 1, further comprising the step of evaluating the group of events comprising the repeated disk-intensive interval to determine whether a time log is able to improve access to data identified by the group of events, and wherein the steps of constructing, detecting and preloading occur when the evaluating step indicates that the time log is able to improve said access.

4. The method of claim 1, in which the steps of examining, defining, constructing, detecting and preloading are performed for each one of a plurality of unique repeated disk-intensive intervals to derive a corresponding unique time log for each one of said plurality of unique disk-intensive intervals; and further comprising the steps of:

tracking a number of executions of each unique time log;

identifying the time log having the highest number of executions during available processing time of a computer processor without regard for whether the trigger has occurred for said time log having the highest number of executions; and when said identified time log comprises one or more first disk drive events, preloading cache memory by executing said one or more first disk drive events in said identified time log.

5. The method of claim 1, in which the steps of examining, defining, constructing, detecting and preloading are performed for each one of a plurality of unique repeated disk-intensive intervals to derive a corresponding unique time log for each one of said plurality of unique disk-intensive intervals.

6. The method of claim 5, further comprising the steps of:

counting the number of executions of each unique time log;

identifying the time log having the highest number of executions during available processing time of a computer processor without regard for whether the trigger has occurred for said time log having the highest number of executions; and when said identified time log comprises one or more first disk drive events, preloading cache memory by executing said one or more first disk drive events in said identified time log.

7. The method of claim 5, further comprising the steps of:

tracking a number of executions of each unique time log;

for any time log having a positive count in the number of executions, periodically decrementing the count in the number of executions;

identifying the time log having the highest count during available processing time of a computer processor without regard for whether the trigger has occurred for said time log having the highest count; and when said identified time log comprises one or more first disk drive events, preloading cache memory by executing said one or more first disk drive events in said identified time log.

8. The method of claim 5, further comprising the steps of:

monitoring disk activity during a repeated disk-intensive interval to determine whether disk activity is below a threshold level; and discarding each time log where the disk activity is not below the threshold level.

9. The method of claim 5, further comprising the steps of:

monitoring the time period from detection of a trigger to completion of a corresponding time log; and discarding the corresponding time log when the monitored time period is not less than a time interval of the repeated disk intensive interval.

10. The method of claim 5, further comprising the steps of:

storing an indication of whether a block of data loaded into cache memory is loaded during execution of a time log;

after completion of a group of events corresponding to a repeated disk-intensive interval, testing the cache memory to determine whether the percentage of blocks addressed by said group of events and stored in the cache memory by the time log is at least a prescribed percentage;

for a time log in which the percentage of blocks addressed by said group of events and preloaded in the cache memory by the time log is not at least the prescribed percentage, discarding the time log.

11. An apparatus for preloading cache memory of a computer system, comprising:

a log of events occurring on the computer system, said log of events comprising disk drive events;

processing means for examining the event log to identify a repeated disk-intensive interval of time, wherein the repeated disk-intensive interval is identified when there are multiple occurrences of a group of events, each occurrence of the group having at least a prescribed percentage of common events;

processing means for defining from one or more events in the event log occurring before an occurrence of said repeated disk-intensive interval a trigger which serves to predict a subsequent occurrence of the repeated disk-intensive interval;

a time log of the group of events occurring during the repeated disk-intensive interval, said group of events comprising at least one disk drive event;

processing means for detecting occurrence of the trigger; and processing means for preloading cache memory by executing said at least one disk drive event of said group of events in said time log after detection of said trigger.

12. The apparatus of claim 11, in which the processing means for defining comprises:

means for selecting at least one candidate trigger which occurs before each one of a prescribed percentage of occurrences of the repeated disk-intensive interval;

means for identifying from among the at least one candidate trigger, each one candidate trigger which precedes the repeated disk-intensive interval in at least a prescribed percentage of occurrences of said repeated disk-intensive interval; and means for selecting a trigger from among the identified each one candidate trigger, the candidate trigger which precedes the repeated disk-intensive interval the greatest prescribed percentage of occurrences of said repeated disk-intensive interval.

13. The apparatus of claim 11, further comprising processing means for evaluating the group of events comprising the repeated disk-intensive interval to determine whether a time log is able to improve access to data identified by the group of events, and wherein a time log is constructed for such group of events processing means for evaluating indicates that the time log is able to improve said access.

14. The apparatus of claim 11, in which a unique time log is achieved for each one of a plurality of unique repeated disk-intensive intervals; and further comprising:

means for counting a number of executions of each unique time log; and means for identifying the time log having the highest number of executions during available processing time of a computer processor without regard for whether the trigger has occurred for said time log having the highest number of executions; and means for preloading cache memory, when said identified time log comprises one or more first disk drive events, by executing said one or more first disk drive events in said identified time log.

15. The apparatus of claim 11, in which a unique time log is achieved for each one of a plurality of unique repeated disk-intensive intervals.

16. The apparatus of claim 15, further comprising:

means for counting a number of executions of each unique time log;

means for identifying the time log having the highest number of executions during available processing time of a computer processor without regard for whether the trigger has occurred for said time log having the highest number of executions; and means for preloading cache memory, when said identified time log comprises one or more first disk drive events, by executing said one or more first disk drive events in said identified time log.

17. The apparatus of claim 15, further comprising:

means for counting a number of executions of each unique time log;

means for periodically decrementing the count in the number of executions for any time log having a positive count in the number of executions;

means for identifying the time log having the highest count during available processing time of a computer processor without regard for whether the trigger has occurred for said time log having the highest count and means for preloading cache memory, when said identified time log comprises one or more first disk drive events, by executing said one or more first disk drive events in said identified time log.

18. The apparatus of claim 5, further comprising:

means for monitoring disk activity during a repeated disk-intensive interval to determine whether disk activity is below a threshold level; and means for discarding each time log where the disk activity is not below the threshold level.

19. The apparatus of claim 5, further comprising:

means for monitoring the time period from detection of a trigger to completion of a corresponding time log; and means for discarding the corresponding time log when the monitored time period is not less than a time interval of the repeated disk intensive interval.

20. The apparatus of claim 15, further comprising:

means for storing an indication of whether a block of data loaded into cache memory is loaded during execution of a time log;

means for testing the cache memory after completion of a group of events corresponding to a repeated disk-intensive interval to determine whether the percentage of blocks addressed by said group of events and stored in the cache memory by the time log is at least a prescribed percentage; and means for discarding the time log for a time log in which the percentage of blocks addressed by said group of events and preloaded in the cache memory by the time log is not at least the prescribed percentage.

* * * * *